May 8, 1951     J. R. FITZPATRICK ET AL     2,551,796
COMPOSITE ARTICLE AND METHOD OF MAKING IT

Filed Nov. 5, 1947

Inventors
James R. Fitzpatrick
Albert N. Carstens
by Parker & Carter
Attorneys

Patented May 8, 1951

2,551,796

UNITED STATES PATENT OFFICE 2,551,796

COMPOSITE ARTICLE AND METHOD OF MAKING IT

James R. Fitzpatrick, Chicago, and Albert N. Carstens, Park Ridge, Ill.

Application November 5, 1947, Serial No. 784,172

12 Claims. (Cl. 154—125)

This invention relates to a laminated device and to a method for making it. It has for one object to provide a method of producing a laminated wooden article suitable for perforation.

It has for another object to provide means in a laminated wooden article for preventing breaking and distortion when the laminated member is perforated or otherwise pierced or cut.

Another object is to provide a cut, pierced or perforated laminated wooden article which is flexible and which may be bent without danger of breaking or cracking.

Other objects will appear from time to time throughout the specification and claims.

This invention is illustrated more or less diagrammatically in the accompanying drawings, wherein.

Like parts are indicated by like characters throughout the specification and the drawings.

1 is a sheet or layer of veneer. 2 is a sheet or layer of fiber or analogous material. 3 is a second sheet of veneer.

Figure 1:
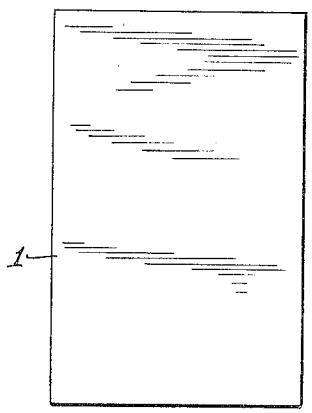
Figure 1 is a plan view of a sheet of veneer.
Figure 2:
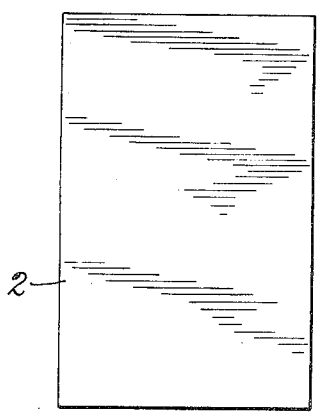
Figure 2 is a plan view of a sheet of fiber of corresponding size.
Figure 3:
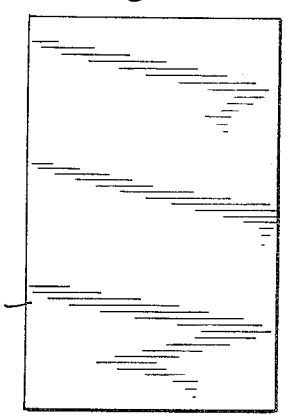
Figure 3 is a plan view of a second sheet of veneer.
Figure 4:
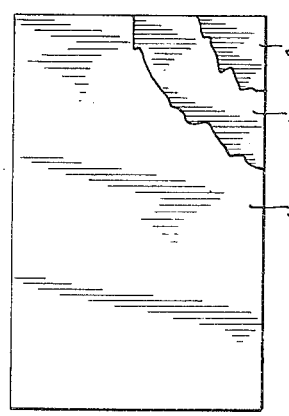
Figure 4 is a plan view with parts broken away showing the veneer and fiber laminated together to form a laminated member.

As shown in Figure 4, the sheets 1 and 3 of veneer have been assembled together with the sheet of fiber between them, and they have been glued, cemented or otherwise fastened together. Many different types of glues or cements may be used, and the invention is not limited to any particular type of glue or cement. Any adhesive which will hold the members permanently together and permit perforation, piercing or cutting is within the contemplation of the invention.

Figure 5:
Figure 5 is a side elevation of the member shown in Figure 4.
Figure 6:
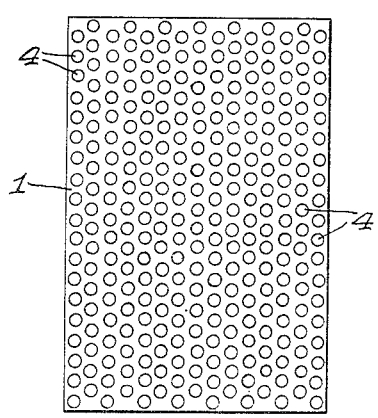
Figure 6 is a plan view of the members shown in Figures 4 and 5 after perforation.
Figure 7:
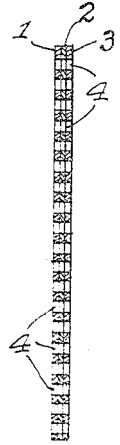
Figure 7 is a transverse section taken through the member of Figure 6.

The laminated composite device as shown in Figures 4 and 5 may be perforated by perforations or piercings 4. These are illustrated in plan in Figure 6 and in section in Figure 7. The piercings or perforations may be positioned in any arrangement. They may be uniformly distributed throughout the area of the member or they may be distributed in a pattern of non-uniform nature, or they may fill part of the area of the member and part of the area may be unpierced or unperforated. While round perforations will frequently be useful, the invention is not limited to any particular shape or size of perforation.

The laminated panel or member illustrated in Figures 4 and 5 may be perforated, punched, notched or pierced by any means and by any sort of tools. It may also be stamped.

The material of the laminated perforated panel may be machined and in many ways worked upon, just as a solid member could be worked upon, and just as a non-perforated laminated member may be worked upon.

The laminated member can be bent effectively without breakage and can be perforated, punched or stamped better than a laminated member formed wholly of wood.

We have referred to the member 2 as formed of fiber. It is preferably formed of vulcanized fiber, although other analogous materials may be used.

When an ordinary laminated panel made wholly of wood is punched, cut or perforated, shattering, cracking and other breakage occurs. When the structure is made as shown in Figures 2 to 7, inclusive, no shattering, cracking or breaking occurs upon working, perforating or cutting, because of the supporting effect of the core sheet 2. This member, in effect, sustains and supports the wood laminations and permits close perforations without cracking of the wood. This hard and tough core member is flexible and also acts as a reinforcement to permit bending of the composite perforated panel to a very small radius without breaking or splitting.

The finished product may therefore be used for many purposes and in many connections in which an ordinary laminated panel or member formed wholly of wood laminations could not possibly be used. The toughness and hardness of the core make it possible to punch, cut or perforate the finished article without cracking or other breakage. This is in part due to the rearrangement of the fibers which occurs in the manufacture of vulcanized fiber of the type generally suggested.

Experience has shown that in punching laminated wooden material where the laminations are relatively soft in the sense that all wood is relatively soft, difficulty develops particularly with the laminations beneath the top layer. In punching, in effect, each layer must act as a die for punching the layer above it. If the lower layers are soft or if all of the lower layers are soft, the fibers of the top layers will not shear off clean but will be impressed into the surface of the layers beneath. From this it results that there is a tearing of each layer of fiber rather than a clean shearing which would occur with the normal action of a punch against a die.

Where the reinforcing fibrous member is used or where a plurality of such members is used with a plurality of wooden laminations, good shearing and punching result because the fiber is hard enough to provide a shearing surface for the layer above it, and the wood of the upper layer is not impressed into the surface of the fiber, but is sheared off clean and a satisfactory result is produced. Therefore, in the structure of the present invention, in which each wooden lamination is in contact with a fiber lamination, satisfactory shearing results from the presence of the fiber lamination which acts as a reinforcing or supporting member for the punching die and produces a clean and satisfactory punch. After the punching has been completed, the fiber lamination or laminations act as a reinforcement for the structure and permit bending without cracking or breaking of the wooden lamination or laminations.

Although we have shown only two laminations of wood and one lamination of fibrous material, it is to be understood that the invention is not limited to this number of parts and it might be embodied in a structure having any number of wooden laminations and any number of fibrous reinforcing members. There might be only one wooden lamination with one fibrous lamination.

A particular advantage of the invention as shown in the figures is that this over-all panel formed of two wooden laminations and one fibrous lamination may be made with a thickness of $\frac{3}{32}$ of an inch or less and may still be satisfactorily punched or pierced and bent on a very small radius without breaking, splitting or shattering. This is impossible with a laminated panel formed of wood alone.

Where the word "panel" is used in the specification and claims, it is to be taken as meaning a generally extended member.

The wood laminations need not be of identical thickness with respect to each other. Also, it is not necessary that the thickness of the fibrous reinforcing material be the same as that of the wood laminations, or of any particular wood lamination.

Although we have shown an operative form of our invention, it will be recognized that many changes in the form, shape and arrangement of parts can be made without departing from the spirit of the invention, and our showing is, therefore, to be taken as, in a sense, diagrammatic.

This application is a continuation-in-part of our co-pending application Serial No. 619,616, filed October 1, 1945, now abandoned.

We claim:

1. In combination in a laminated article, a plurality of sheets of wood veneer, and sheets of reinforcing material comprising vulcanized fiber harder than said veneer, there being a sheet of said vulcanized fiber positioned between each pair of sheets of wood veneer, all of said sheets being cemented together, said laminated article being provided with a plurality of perforations.

2. In combination in a laminated article, a plurality of sheets of wood veneer, and sheets of reinforcing material comprising vulcanized fiber harder than said veneer, there being a sheet of said vulcanized fiber positioned between each pair of sheets of wood veneer, all of said sheets being cemented together, said laminated article being provided with a plurality of perforations extending through all of said sheets.

3. In combination in a laminated panel, a pair of wood veneer sheets, and a sheet of tough reinforcing material harder than said wood veneer positioned between said sheets and secured thereto, said composite article being provided with a plurality of perforations passing through said wood sheets and said reinforcing sheet.

4. In combination in a laminated panel, a pair of wood veneer sheets, and a sheet of tough, hard reinforcing material comprising vulcanized fiber harder than said wood veneer, said sheet of vulcanized fiber being positioned between said wood veneer sheets and secured thereto, said composite article being provided with a plurality of perforations passing through said wood sheets and said reinforcing sheet.

5. The method of forming a perforated, laminated panel which comprises the following steps: preparing a plurality of sheets of wood, preparing a plurality of sheets of supporting and reinforcing material harder than said wood, positioning one of said supporting and reinforcing sheets between each pair of said wooden sheets and securing the composite mass together, and thereafter perforating the composite mass.

6. The method of forming a perforated, laminated panel which comprises the following steps: preparing a plurality of sheets of wood, preparing a plurality of sheets of supporting and reinforcing material tougher than said wood, positioning one of said supporting and reinforcing sheets between each pair of said wooden sheets and securing the composite mass together, and thereafter perforating the composite mass.

7. The method of forming a perforated, laminated panel which comprises the following steps: preparing a plurality of sheets of wood, preparing a plurality of sheets of reinforcing material tougher and harder than said wood, positioning one of said reinforcing sheets between each pair of said wooden sheets and securing the composite mass together by adhesive means, and thereafter perforating the composite mass.

8. The method of forming a perforated, laminated panel which comprises the following steps: preparing a plurality of sheets of wood, preparing a plurality of sheets of supporting and reinforcing material tougher and harder than said wood, positioning one of said reinforcing sheets between each pair of said wooden sheets and securing the composite mass together, and thereafter perforating the composite mass with perforations which extend uninterruptedly through the wooden and reinforcing sheets.

9. The method of forming a perforated, laminated panel which comprises the following steps: preparing a plurality of sheets of relatively thin wood, preparing a plurality of sheets of supporting and reinforcing material comprising vulcanized fiber tougher and harder than said wood, positioning one of said supporting and reinforcing sheets between each pair of said wooden sheets and securing the composite mass together and thereafter perforating the composite mass.

10. The method of forming a perforated, laminated panel which comprises the following steps: preparing a plurality of sheets of relatively thin wood, preparing a plurality of sheets of supporting material comprising vulcanized fiber tougher and harder than said wood, positioning one of said supporting sheets between each pair of said wooden sheets and securing the composite mass together by adhesive means, and thereafter perforating the composite mass with perforations which extend uninterruptedly through the wooden and supporting sheets.

11. In combination in a laminated article, a sheet of wood veneer and a sheet of supporting material tougher than said veneer, positioned thereagainst and cemented thereto, the composite laminated article formed of the said two sheets being provided with a plurality of perforations.

12. The method of forming a perforated laminated panel which comprises the following steps: cementing together a sheet of wood and a sheet of supporting material harder than said wood, and thereafter perforating the composite mass formed by the sheet of wood and the sheet of supporting material.

JAMES R. FITZPATRICK.
ALBERT N. CARSTENS.

REFERENCES CITED

The following references are of record in the file of this patent:

UNITED STATES PATENTS

| Number | Name | Date |
|---|---|---|
| 739,861 | Harrass | Sept. 29, 1903 |
| 2,280,582 | Hoeflich | Apr. 21, 1942 |
| 2,417,175 | Raffles | Mar. 11, 1947 |
| 2,447,609 | Breece | Aug. 24, 1948 |